Sept. 28, 1965 W. E. BRADLEY 3,209,071

COLOR TELEVISION RECEIVER GAIN CONTROL SYSTEM

Original Filed Feb. 2, 1951 3 Sheets-Sheet 1

INVENTOR.
WILLIAM E. BRADLEY
BY
Dean V. Hazeltine
ATTORNEY

COLOR TELEVISION RECEIVER GAIN CONTROL SYSTEM

Original Filed Feb. 2, 1951 3 Sheets-Sheet 2

INVENTOR.
WILLIAM E. BRADLEY
BY
Allen V. Hazeltine
ATTORNEY

INVENTOR.
WILLIAM E. BRADLEY
BY
[signature]
ATTORNEY

United States Patent Office 3,209,071
Patented Sept. 28, 1965

3,209,071
COLOR TELEVISION RECEIVER GAIN CONTROL SYSTEM

William E. Bradley, Washington, D.C., assignor, by mesne assignments, to Philco Corporation, Philadelphia, Pa., a corporation of Delaware Continuation of application Ser. No. 208,993, Feb. 2, 1951. This application Jan. 22, 1960, Ser. No. 4,153
23 Claims. (Cl. 178—5.4)

Figure 1:
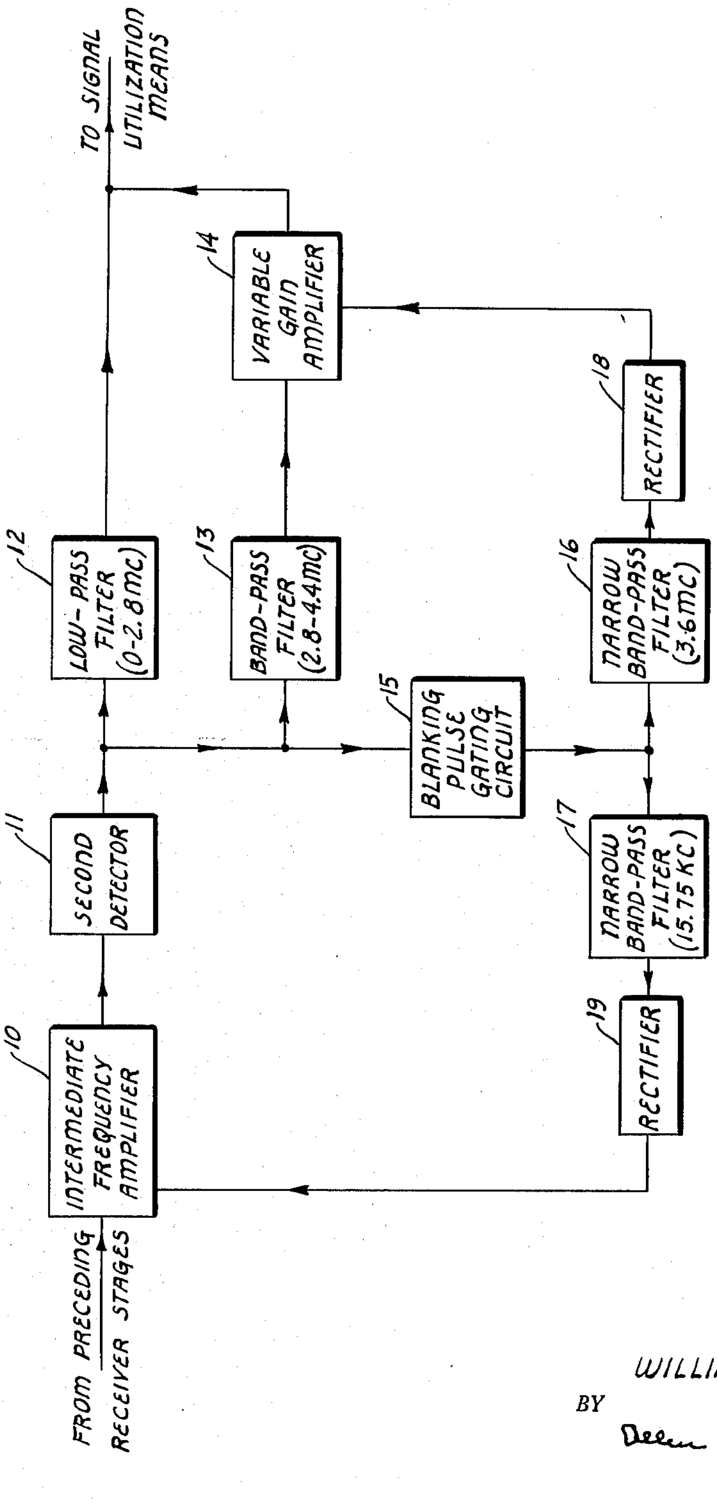

This application is a continuation of application Serial No. 208,993, filed February 2, 1951.

The present invention relates broadly to methods of and apparatus for improving color television reception and, more particularly, to methods of and circuit arrangements for maintaining predetermined amplitude relations between color television signal components of different frequencies.

Inasmuch as the desirability of maintaining the aforesaid amplitude relations has heretofore escaped the notice of those skilled in the art, it will be necessary to explain the reasons therefor in some detail, so that the importance of the improvement may be fully appreciated. Only then will it be possible to consider the circuits embodying my inventive concept in their proper relation to the state of the art prior to my invention.

To begin with, it should be noted that the invention is particularly applicable to so-called dot-sequential systems of color television. In such a system, there is produced a signal which is successively indicative of the red, green and blue color content of small elements of the scene which is to be televised. For this purpose, there may, for example, be provided three simultaneously scanning television cameras, each of which views the scene to be televised and each of which is equipped with a primary color filter, so that one camera produces a video output signal whose amplitude varies in accordance with the green elements of the scene, while the other two cameras produce output signals respectively indicative of the red and blue scene elements. The amplitudes of the three color output signals are then sequentially sampled, at equally time-spaced intervals, producing a series of pulses occurring at the sampling instants, and of amplitudes corresponding to the amplitude of the respective one of the three sampled color signals, also at the sampling instants. The rate at which each of the original color signals is sampled is very high, being equal to 3.6 megacycles in some presently contemplated embodiments. These output pulses are then applied to a filter which converts them into a sinusoidally varying 3.6 megacycle chrominance signal superimposed on a more slowly varying, or average component representing brightness or luminance. It now remains to combine this color signal with the necessary blanking and synchronizing impulses to ready the signal for transmission to distant receivers.

As indicated, the composite picture signal will, between consecutive synchronizing pulses, consist of a luminance component of slowly time-varying amplitude which corresponds to the average brightness of the televised scene, and of a sinusoidal chrominance component varying at the rate of 3.6 megacycles per second and indicative, at cyclically recurrent instants, of the intensity of each of the three transmitted primary color components. The nominal frequency of this sinusoidal component can, of course, not vary, since it is fixed by the sampling rate at the transmitter. However, both the phase and the amplitude of this color signal can vary, the former due to changes in the ratios of the three primary color components and the latter due to changes in the absolute intensity or color saturation of one or more of these primary color components.

Thus, to obtain a complete reproduction of the color signal at the receiver, there must be transmitted not only the basic 3.6 mc. signal but also the sidebands resulting from phase and amplitude modulation thereof. Note, particularly, that the amplitude of the 3.6 mc. color signal component may vary, even though the average brightness component remains unchanged. This will occur, for example, when the intensity or color saturation of the red elements in the televised scene increases while the intensity of the green and blue elements simultaneously decreases. Under such conditions, the red signal sample, and with it the maximum amplitude of the 3.6 mc. color signal, will be enhanced, while the average brightness which is a function of all three color components remains constant. Furthermore, changes in average brightness, if any, naturally tend to occur at a much slower rate than the 3.6 mc. rate of color signal change, and are in fact deliberately limited to say the 0 to 2.8 megacycle band at the transmitter.

At the receiver, the amplitude of the composite television signal is again sampled, in synchronism with the transmitter sampling operation, means being provided for producing cyclically recurrent light emission in the three transmitted colors, at the corresponding sampling instants, and with intensities corresponding to the amplitude of the sample.

It has now been found that various portions of the signal path between the cameras and the receiver do not transmit the low frequency signal components corresponding to brightness and the high frequency signal components corresponding to color intensity or color saturation with the same facility. This is particularly true of the path which the signal follows through the air between radiation from the transmitter antenna and reception by the receiver antenna. It is, in fact, extremely unlikely that this aerial path will attenuate the color signal to exactly the same extent as the total illumination signal.

As a result the relative amplitudes of the color (chrominance) component and of the total illumination (luminance) component will not be the same at the receiver as at the transmitter. Consequently, sampling of the received signal will not reproduce color signals of the proper amplitude and the coloration of the received picture will not be an accurate reproduction of that of the televised scene.

This would not present a serious problem if the discrepancy between the transmission characteristics of the signal path for low and high frequency signals remained fixed, for it would then be a simple matter to preset the frequency response characteristics of the receiver to compensate therefor.

Unfortunately, this is not the case in practice. Instead this discrepancy in transmission characteristics is strongly dependent upon the condition of the medium which the signal traverses, varying with weather and air mass changes as well as when tuning from one transmitter to another.

Complete compensation of such variable discrepancies can, of course, not be obtained by fixed presetting of receiver characteristics.

An analogous difficulty may be encountered when it is attempted to adjust the fine tuning control of the television receiver to its optimum setting. Here the skewed frequency characteristic of the receiver amplifiers may produce different gain variations for high and low frequency signal components, thereby making it difficult to determine when the receiver is adjusted for highest fidelity of color reproduction.

No provision has, heretofore, been made in any color television receiver of which I am aware, to provide compensation for these variations, which I have found to be responsible for many of the unexplained color distortions which have been encountered.

It is, accordingly, an object of the invention to effect improvements in the methods of and apparatus for color television reception which will insure accurate reproduction of the coloration of a televised scene.

It is another object of my invention to provide a method of and means for reducing the color distortion in color television reproduction which is due to inequalities in transmission characteristics at different frequencies of the path followed by the television signal between the transmitter and the receiver.

It is still another object to provide means, in a color television receiver, for modifying its internal frequency response characteristic so as to compensate for frequency response changes in the path followed by the signal prior to reception.

It is a still further object of the invention to incorporate means in a color television receiver which are adapted to detect changes in the frequency response of the aerial path traversed by the received signal, these means being responsive to such changes to modify the internal frequency response of the receiver so as to maintain the combined frequency response of the aerial path and receiver constant.

Still another object of the invention resides in the provision of means, in a color television receiver, which are adapted to render its color fidelity independent of fine tuning.

To achieve the foregoing objects of my invention, as well as others which will appear, I provide my receiver with first means for measuring the amplitude of a signal component whose frequency is typical of the low frequency components of the signal but whose transmitted amplitude is maintained constant independently of picture information. I provide the receiver with second means for measuring the amplitude of another signal component whose frequency is typical of the high frequency components of the signal and whose transmitted amplitude is likewise held constant independently of picture information, the transmitted amplitudes of said signal components having a predetermined ratio. The measured relative amplitudes of these components at the receiver, therefore, depend only on the relative transmission characteristics of the signal path for low and high frequency signals, respectively.

I then provide additional means, controlled by the output of one of these measuring means and operative to modify the over-all gain of certain stages of the receiver proper, so as to maintain the output of this one measuring means constant. This compensates for variations in the signal path characteristic for signals in the frequency range represented by the measured signal. If the signal path characteristic for signals in the other frequency range varies in proportion, then the output of the other measuring means will also remain constant. Should this not be the case, that is, should the variations in the signal path characteristic for low frequency signals be different from variations for high frequency signals, then the output of the other measuring means will vary, even though the output of the first measuring means remains constant, i.e. said outputs will deviate from the predetermined ratio established at the transmitter. Accordingly, I provide still further means, controlled by the output of this other measuring means and operative to modify the gain of certain receiver stages, but only for signals in the frequency range represented by the signal measured by the last-named measuring means, so as to maintain constant the output of this last-named measuring means. This last-named means is further characterized in that it does not affect the gain of those stages which it controls, for signals in the frequency range of the signal measured by the first-named means. Thus unequal variations in the low and high frequency signal transmission characteristic are compensated and true color signals are reproduced in the receiver, i.e. color saturation control is effected.

The two signal components which are actually measured, for the purposes hereinbefore briefly described, are the horizontal line synchronizing pulses and the color synchronizing bursts. These latter are transmitted, at cyclically recurrent intervals, for the purpose of keeping the color sampler of the receiver precisely in step with that of the transmitter. Each such color burst consists of an odd number of half-cycles of a sine wave having the same frequency as the color signal component, but differing therefrom in several respects. The most important difference, for my purpose, is that the amplitude of the color burst is deliberately maintained fixed at the transmitter while the amplitude of the color signal may vary due to changes in picture content. As is well known, a typical composite television signal comprises the video signals hereinbefore described, horizontal synchronizing pulses cyclically recurrent at the horizontal scanning frequency, and blanking signals upon which the synchronizing pulses are pedestaled so as to insure that the scanning retrace lines will not become visible upon the receiver viewing tube screen. In accordance with present operating standards, the synchronizing pulses occupy only the leading half of the space atop each blanking pulse, leaving the trailing half unoccupied. It is upon this trailing portion or "back porch" of the blanking pedestal that the color burst is superimposed at the transmitter, where its amplitude is held constant with respect to that of the synchronizing pulse which it follows, i.e. their amplitudes have a predetermined ratio.

The synchronizing pulses of course recur at the horizontal line frequency, which is within the range of frequencies of the average brightness component of the composite signal and their amplitude is also held constant at the transmitter.

Briefly summarizing, then, unequal variations in transmission characteristic of the signal path for low and high frequency signal components are overcome, in accordance with my invention, by first stabilizing the amplitude of one received component and then measuring variations in the other component and deriving therefrom a control signal for compensatorily modifying the receiver transmission characteristic for signals of the frequency of this other component. The two signal components used for purposes of such comparative measurement are the synchronizing pulses and the color synchronizing bursts, since their frequencies are respectively representative of the two different frequency luminance and chrominance components, while their relative amplitudes are independent of picture information and are, therefore, dependent only upon the transmission characteristics of the signal path.

Figure 1A:
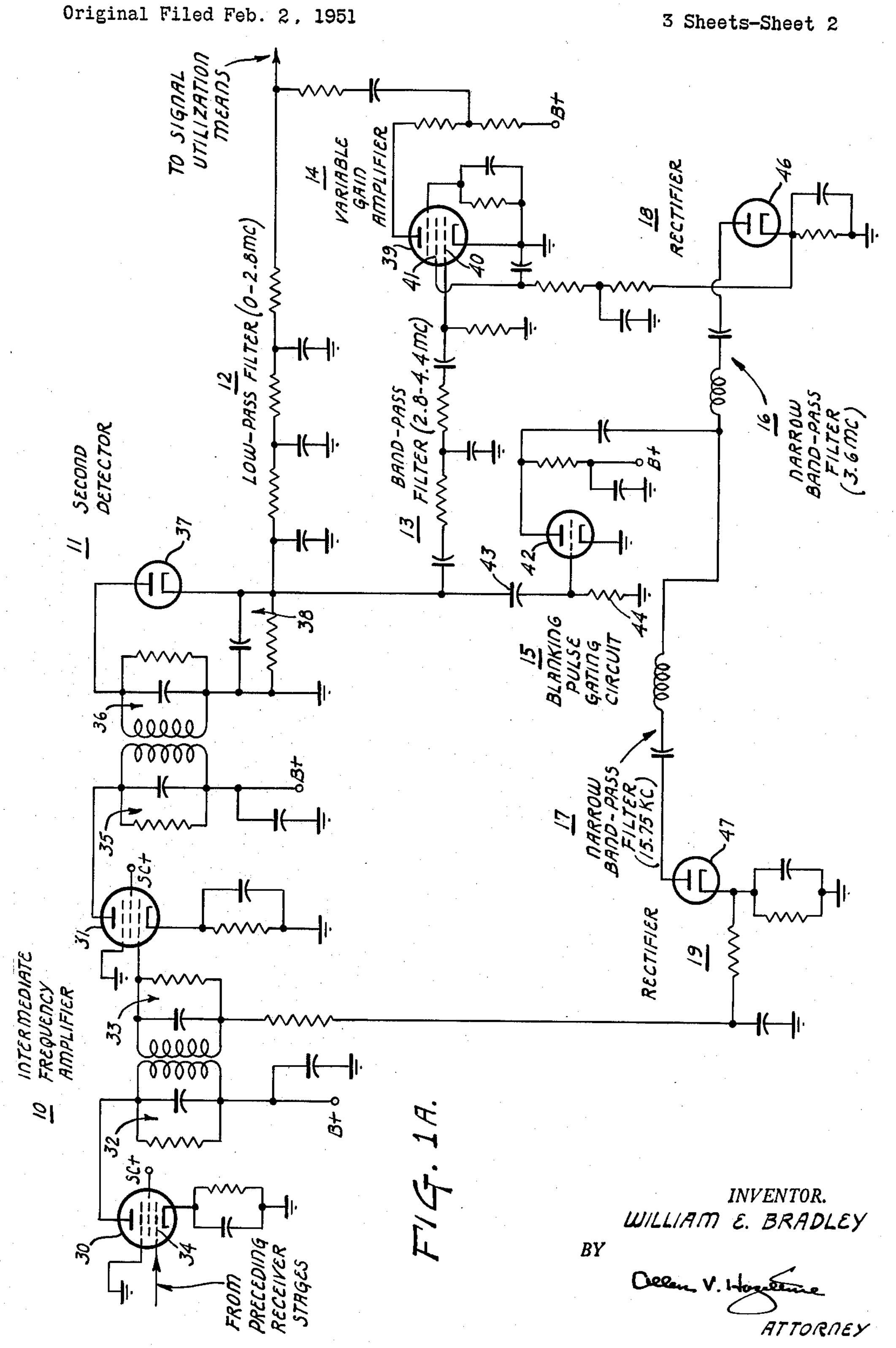
Figure 2:
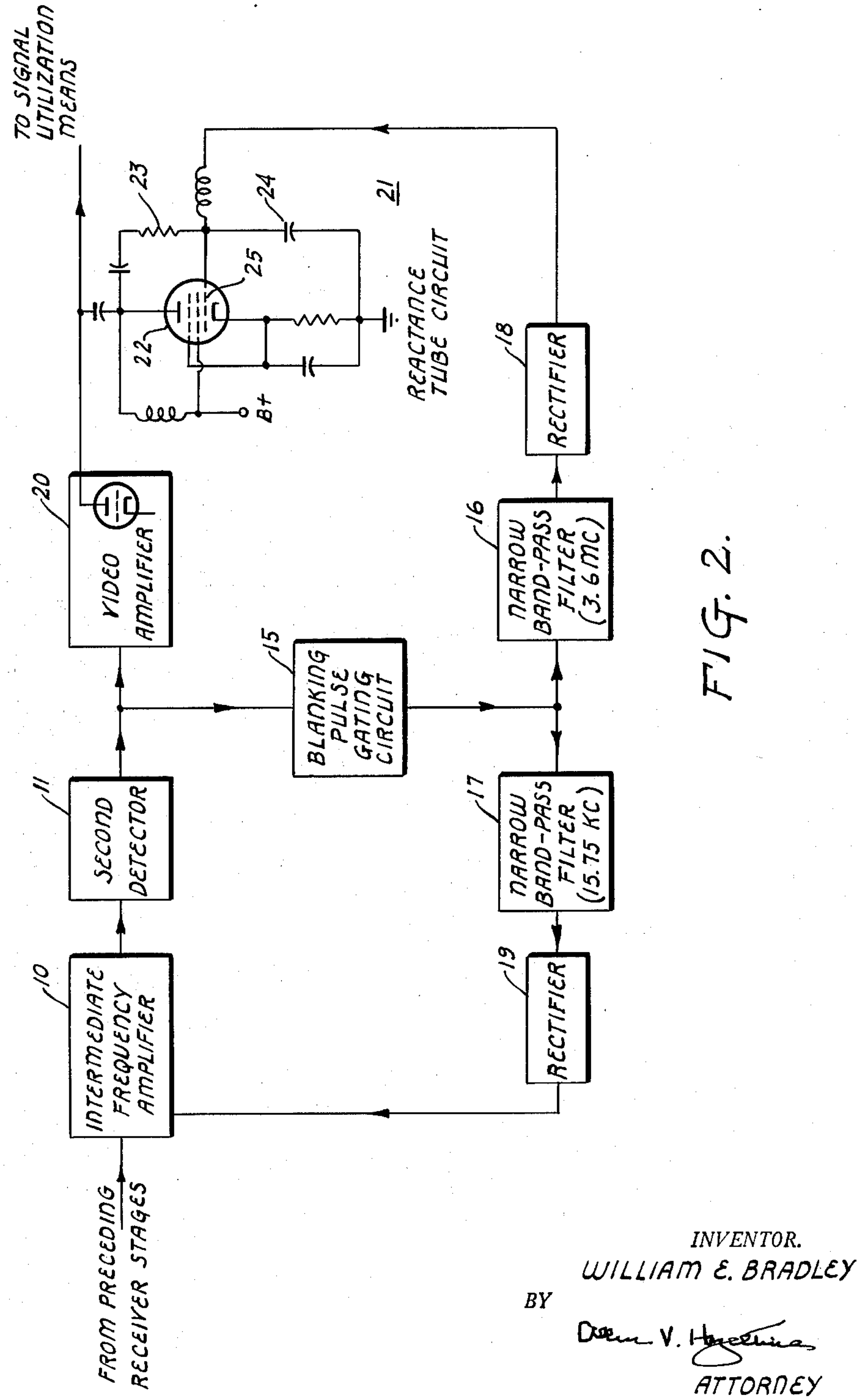

The various features and operational characteristics of apparatus embodying my invention will be more readily understood from the subsequent detailed description and accompanying drawings wherein FIGURE 1 shows a block diagram of that portion of a color television receiver which incorporates an embodiment of my invention, together with such conventional apparatus as is intimately related thereto;

FIGURE 1A is a schematic of one form which the circuit elements shown as blocks in FIGURE 1 may take; and FIGURE 2 shows a preferred embodiment of my invention, together with the same conventional apparatus as shown in FIGURE 1.

Illustrated in FIGURE 1, to which more particular reference may now be had, is a conventional intermediate frequency amplifier 10 of any of the several types commonly used in present day television receivers. The output of this intermediate frequency amplifier is supplied to a conventional second detector 11 which operates to detect the envelope of the intermediate frequency signals supplied thereto, producing a so-called video frequency output signal which corresponds to the actual picture signal derived from the transmitter cameras, together with such blanking and synchronizing pulses as may be superimposed thereon for various purposes. Both the I.-F. amplifier 10 and the second detector 11 are conventionally encountered in most television receivers, where they function in the manner hereinbefore outlined. The inventive portion of the system illustrated in FIGURE 1, while involving in its operation both the I.-F. amplifier and the second detector, actually is structurally confined to that portion of the apparatus immediately following the second detector. As may be seen from the drawing, the output signal derived from second detector 11 is applied to two parallel paths, one of which includes low pass filter 12, while the other includes band pass filter 13 followed by variable gain amplifier 14. These circuit components constitute a signal-translating network for translating the luminance and chrominance components in which the relative amplification of said translated components can be varied. Output signals derived from the second detector are further simultaneously supplied to a blanking pulse gating circuit 15 which is so arranged as to permit passage of video frequency signals, or indeed of any other signals, only during the interval characterized by the presence of a horizontal blanking pulse. Any one of a well known variety of gating circuits may be selected for this purpose, as, for example, a triode biased so far negatively as to be non-conductive during intervals between positive blanking pulses, while being driven into conduction by the application of such pulses, as well as by the still more positive synchronizing pulses and color bursts superimposed thereon. The output signal of this blanking pulse gating circuit 15 is simultaneously supplied to two extremely narrow band pass filters, respectively designated by reference numerals 16 and 17, whose output signals are, in turn, supplied to rectifiers 18 and 19 respectively. The output of rectifier 18, which derives its input signal from band pass filter 16, is supplied to variable gain amplifier 14 in a manner and for purposes which will appear from the subsequent description. The output of rectifier 19 on the other hand, which latter derives its input signal from band pass filter 17, is applied to intermediate frequency amplifier 10, again for reasons which are fully discussed hereinafter.

Observe now that, while the arrangement of the elements hereinbefore described is novel and without precedent in the prior art, the individual elements are all well known and do not, therefore, require detailed description here. Thus, low pass filters such as filter 12 are well known in the art and so are band pass filters like filters 13, 16 and 17. Since any one of numerous practical forms of such filters may be used in this embodiment, it will suffice, for my present purposes, to define these various filters in terms of the frequency range of the signals which they are adapted to transmit. Naturally, they are further arranged to exclude all signals outside those specified frequency ranges. Thus, low pass filter 12 should permit unimpeded passage of all the low frequency video signals, these being, in the present instance, signals in the range of 0 to 2.8 megacycles. Band pass filter 13 should transmit the high frequency color signal at its nominal frequency of 3.6 megacycles, together with the sidebands resulting from its modulation by color information. The useful ones of these sidebands extend approximately 0.8 megacycle on either side of the nominal frequency, so that band pass filter 13 preferably transmits all signals in the frequency range of 2.8 to 4.4 megacycles. Narrow band pass filter 16 is arranged to transmit signals of the nominal color signal frequency, which is 3.6 megacycles in the case here contemplated, to the substantial exclusion of all other signals, and finally, narrow band pass filter 17 is arranged to transmit only signals of a frequency corresponding to the horizontal synchronizing pulse repetition rate, or 15.75 kilocycles.

As has been previously indicated, there appears, at the output of second detector 11, the composite video signal which consists principally of the low frequency brightness (luminance) components, the high frequency color (chrominance) components superimposed thereon, and blanking pulses periodically recurrent at a 15.75 kc. rate and each of which has a horizontal synchronizing pulse and a color synchronizing burst superimposed thereon. From the output of this second detector, however, these signals now proceed along different paths to which they are constrained by the four filters provided for this purpose. Thus, the low frequency brightness components of the picture signal will follow the parallel path which includes low pass filter 12. These signals will be excluded from all the other paths either by the presence of band pass filter 13, which is non-transmissive of signals in their frequency range, or because of blanking pulse gating circuit 15 which passes signals only during the presence of a blanking pulse, during which time the aforesaid low frequency brightness components are obliterated by the blanking pulse. The high frequency color signal components, on the other hand, will proceed from the second detector output along the path which includes band pass filter 13 and variable gain amplifier 14. These signals will, again, be excluded from all other paths either by low pass filter 12 or by blanking pulse gating circuit 15. The synchronizing portion of the signal, which is entirely confined between the limits of the blanking pulse, will, first of all, be passed by blanking pulse gating circuit 15 to the two narrow band pass filters 16 and 17 which receive its output signal. The fundamental component of the horizontal synchronizing pulse is then at exactly the right frequency for passage through narrow band pass filter 17, while the color synchronizing burst is, of course, at the proper 3.6 mc. frequency for passage through narrow band pass filter 16. Thus these two narrow band pass filters operate to separate the 15.75 kilocycle synchronizing pulse from the 3.6 megacycle color synchronizing burst. The output of narrow band pass filter 17, which now consists exclusively of a signal of 15.75 kilocycle frequency corresponding to the fundamental component of the horizontal synchronizing pulse has an amplitude proportional to the amplitude of the synchronizing pulse. It will, therefore, produce a unidirectional output potential from rectifier 19 whose amplitude is proportional to the amplitude of the synchronizing pulses. The unidirectional output voltage of this rectifier is utilized in the manner of a conventional automatic gain control potential, being applied to various portions of the intermediate frequency amplifier 10 in a manner well known to the art to provide control of the gain of this amplifier in such a manner as to maintain the amplitude of the horizontal synchronizing pulses constant. Ordinarily, the conventional I.-F. amplifier 10 is not frequency selective as between low frequency and high frequency signal components. Therefore, such control of the gain of the amplifier by a control signal proportional to the amplitude of the horizontal synchronizing pulses, as developed by rectifier 19, will modify both its low frequency response and its high frequency response, so that signals of the high color signal frequency will be enhanced and diminished in accordance with the requirements of the low frequency components, whose amplitude fluctuations are alone measured by rectifier 19. If the color television receiver is operating properly, then variations in the amplitude of any or all of the signal components in the intermediate frequency amplifier, whose low frequency output amplitude is measured by rectifier 19, is, of necessity, due to changes in the signal path external to the receiver. If these changes affect the transmission of high and low frequency signal components equally, then control of the over-all gain of intermediate frequency amplifier 10 in accordance with its low frequency signal output component, as provided by rectifier 19, will be sufficient to maintain constant not only the total amplitude of all signal components but also their relative amplitudes aside from desired amplitude variations due to picture information. It will be recalled that this is required for faithful color reproduction. If this be the case, then the amplitude of the 3.6 megacycle color synchronizing burst, whose amplitude is independent of picture content and therefore dependent only upon the transmission characteristics of the signal path, will also remain constant, and so will the unidirectional output potential of rectifier 18 which measures the amplitude of these color bursts.

Note, in this connection, that the fundamental 15.75 kilocycle component of the horizontal synchronizing pulses is not the only one which may be used to control the gain of the I.-F. amplifier 10. Instead any or all of such other frequency components of these pulses may be used for the same purpose as are located within the frequency range of the low frequency brightness components. In that case, the band pass characteristic of filter 17 would, of course, have to be modified to permit the passage of such other components while excluding components of color signal frequencies.

In any event, since the relation between the amplitudes of the color synchronizing burst and the horizontal synchronizing pulse is always fixed at the transmitter it is now a simple matter to adjust the variable gain amplifier so that the aforesaid constant unidirectional output potential of rectifier 18 will produce an amplifier gain just sufficient to maintain the proper amplitude relation between the high frequency components which appear at its output and the low frequency components which appear at the output of filter 12. However, more often than not, the effect of variations in the signal path external to the receiver upon low and high frequency signal components is unequal. Then, even though rectifier 19 is operative to vary the gain of intermediate frequency amplifier 10 so as to maintain its low frequency output constant, the high frequency output of this I.-F. amplifier will, nevertheless, vary. Consequently, the amplitude of the 3.6 megacycle color synchronizing burst will also vary, both at the output of the intermediate frequency amplifier 10 and at the output of narrow band pass filter 16. This will, in turn, produce variations in the output of rectifier 18 to which only the color synchronizing burst is applied. This output potential, which is supplied to variable gain amplifier 14 in a manner analogous to that in which the output potential of rectifier 19 is supplied to intermediate frequency amplifier 10, is then used to modify the gain of the amplifier 14 in direct proportion to variations in the unidirectional output potential of rectifier 18 but in opposite phase. That is, if the amplitude of the 3.6 megacycle color synchronizing burst decreases, the unidirectional output potential of rectifier 18 also decreases, the variable gain amplifier being arranged to be responsive to such decreases to increase its gain in proportion. An increase in the amplitude of the rectified output potential of rectifier 18, on the other hand, produces a corresponding decrease in the gain of amplifier 14. Variable gain amplifier 14 is then adjusted in such a manner that variations in the unidirectional control potential applied thereto from rectifier 18 will change its gain enough to compensate for signal changes indicated by control potential changes. Since band pass filter 13 permits only high frequency signal components to traverse variable gain amplifier 14, only their amplitude will be affected by variations in its gain, thus altering the relative amplitudes of the high and low signal components as received and compensating for unequal variations of the two due to signal path characteristics.

At the outputs of filter 13 and variable gain amplifier 14 there now appear the low and high frequency components, respectively, of the composite television signal with their relative amplitudes restored to the relation which existed between them at the transmitter. Thence they may be recombined for joint application to the signal utilization means which conventionally follow the second detector.

In review, then, the over-all gain for both high and low frequency signal components of the intermediate frequency amplifier incorporated in my improved television receiver is controlled in response to a low frequency component of this signal whose amplitude is independent of picture information. Variations in high frequency signal component amplitude which occur independently of picture information and which are not compensated for by this process are measured by measuring the amplitude of a high frequency signal component whose amplitude is independent of picture information, the output of the measuring device being utilized to control the amplitude of the high frequency signal components only so as to maintain their amplitude constant.

As has been pointed out, the individual elements which constitute the system illustrated in FIGURE 1 and which are represented there by suitably labeled blocks are all entirely conventional in construction. One form which each of these elements may take for the purpose of practicing my invention is shown in the schematic diagram of FIGURE 1A to which more particular reference may now be had. Thus, the intermediate frequency amplifier 10 may comprise a pair of pentode vacuum tubes 30 and 31 and a conventional coupling network comprising parallel resonant circuits 32 and 33 interconnecting these pentode tubes. The tubes are further supplied with anode and screen operating potentials B+ and $S_c$+ in the usual manner. To the control grid electrode 34 of tube 30 there is applied the received composite color television signal subject to the modification which it may have undergone in preceding receiver stages and which may include a certain degree of amplification, as well as frequency conversion from the radio frequency to the intermediate frequency range. An amplifier substantially like I.-F. amplifier 10 of FIGURE 1A is shown on page 105 of "Television Simplified" by Milton F. Kiver, Second edition, D. Van Nostrand Company, Inc., New York, 1946. The amplifier output of the intermediate frequency amplifier is supplied, by way of another pair of coupled parallel resonant circuits 35 and 36, to a conventional second detector 11 which may comprise a diode 37 connected in series between a parallel R-C network 38 and the resonant circuit 36. Such a second detector circuit is illustrated on page 110 of the aforementioned Kiver publication. The diode 37 operates to detect the envelope of the intermediate frequency signal supplied thereto and to develop, across R-C network 38, a so-called video frequency output signal which corresponds to the actual picture signal derived from the transmitter cameras, together with such blanking and synchronizing pulses as may be superimposed thereon for various purposes.

As has been explained in connection with FIGURE 1, the output signal from second detector 11 is applied to parallel paths, one of which includes low-pass filter 12, while the other includes bandpass filter 13, followed by variable gain amplifier 14. As has also been pointed out, the components of filter 12 are so chosen, in accordance with conventional criteria of filter construction, that the filter will permit substantially unimpeded passage of all the low frequency video signals, these being, in the present instance, signals in the range of 0 to 2.8 megacycles. Bandpass filter 13, on the other hand, is construed to transmit the high frequency color signal at its nominal frequency of 3.6 megacycles, together with the sidebands resulting from its modulation by color information. Since the useful ones of these sidebands extend approximately 0.8 megacycle on either side of the nominal frequency, bandpass filter 13 preferably transmits all signals in the frequency range of 2.8 to 4.4 megacycles. The procedure to be followed in selecting these components for a number of conventional filter arrangements including those which are illustrated in FIGURE 1A are fully set forth in "Electric Circuits and Wave Filters" by A. T. Starr, published 1938 by Pitman Publishing Corporation, New York.

The variable gain amplifier 14 comprises a pentode vacuum tube 39 to the control grid electrode 40 of which the video signal from bandpass filter 13 is applied in the usual manner. Such a variable gain amplifier is disclosed on page 25 of the July 1937 issue of "Electronics."

It is apparent that a varying unidirectional potential applied to the screen grid electrode 41 of this tube will cause the gain of the tube and with it the gain of the amplifier for signals supplied to electrode 40 to vary.

The blanking pulse gating circuit 15 to which the output of second detector 11 is also applied may comprise a triode vacuum tube 42 whose control grid electrode is supplied with detector output signals through a capacitor 43. Such a gating circuit is illustrated on page 230 of the aforementioned Kiver publication. When the signal which is supplied to the control grid electrode of tube 42 becomes positive, as it does during the occurrence of horizontal blanking pulses, for example, grid current will flow and charge capacitor 43. Between blanking pulses the signal will be less positive and this capacitor will discharge through grid leak resistor 44. Thus an average negative potential will develop at the control grid which, by proper choice of relative capacitor and resistor values, may be made just large enough to maintain the triode non-conducting between successive blanking pulses. This triode will then be driven into conduction by the blanking pulses and also by the still more positive synchronizing pulses and color bursts superimposed thereon and these latter will appear in its anode output circuit. Each of the two extremely narrow bandpass filters 16 and 17, to which the output signal from the blanking pulse gating circuit 15 is simultaneously supplied, may consist merely of a very high Q series resonant circuit, as illustrated, which is tuned to resonance at the frequency which it is desired to transmit. As is well known, the impedance of such circuits rises very rapidly as the signal frequency departs from resonance and, conversely, their signal transmissivity declines. Such series resonant circuits and their signal transmission characteristics are discussed beginning on page 135 of "Radio Engineer's Handbook" by F. E. Terman, published 1943 by McGraw-Hill Book Co., Inc., New York. The output signals of filters 16 and 17 are, in turn, supplied to conventional rectifiers 18 and 19. These rectifiers may comprise different diode vacuum tubes, designated 46 and 47 respectively, which rectify the alternating signal supplied thereto from the preceding narrow bandpass filters, and also one or more (two are illustrated) low-pass filters in each of their charging paths for the conventional purpose of smoothing out the ripples in the rectified signals. Rectifiers of this kind are disclosed on page 117 of the aforementioned Kiver publication. The filtered output of rectifier 18 is then applied to electrode 41 of the controllable gain amplifier tube 39, while the filtered output of rectifier 19 is applied, through resonant circuit 33, to the control grid electrode of the second tube 31 of the intermediate amplifier 10.

Note that the system illustrated in FIGURES 1 and 1A has the very desirable characteristic of compensating for relative amplitude changes between high and low signal frequency components by operating on one of these to the complete exclusion of the other. However, this necessitates complete separation of the two signal components, which can only be effected by means of the complex and expensive filters provided in the embodiment of FIGURE 1. I have found that it is possible to dispense with such complete separation of the two signal components by providing control means which operate on one component to the substantial exclusion of the other, even though both components be present at the point where control is effected. A circuit illustrating such an arrangement is shown in FIGURE 2, to which reference may now be had.

This circuit is similar to that of FIGURE 1 in many important respects and identical portions of the two figures have therefore been designated by identical reference numerals. In fact, the two circuits differ only in the precise nature of the path traversed by the composite video signal following detection. Otherwise, each circuit comprises a conventional intermediate frequency amplifier 10, a second detector 11, the blanking pulse gating circuits 15, filters 16 and 17 and rectifiers 18 and 19 whose structural and operational characteristics have all been fully described in connection with FIGURE 1. Suffice it to recall, therefore, that rectifier 19 produces a unidirectional output potential of magnitude proportional to the amplitude of the horizontal synchronizing pulses, while rectifier 18 produces a unidirectional output potential proportional to the amplitude of the color synchronizing bursts. The former unidirectional potential is used to control the over-all gain of I.-F. amplifier 10 to compensate for signal amplitude fluctuations as revealed by changes in the output of detector 19. As in the embodiment of FIGURE 1, a constant unidirectional potential then appears at the output of rectifier 18 as long as the high frequency response of the signal path preceding the I.-F. amplifier fluctuates equally for high and low frequency components. When this is not the case, the output of rectifier 18 varies.

As shown in FIGURE 2, the output of second detector 11 is supplied, not only to gating circuit 15, but also to video amplifier 20. This video amplifier may take any conventional form provided only that it be substantially equally transmissive of both high and low frequency components of the composite video signal supplied thereto. The only additional apparatus is the reactance tube circuit 21, which is connected in shunt with the output terminal of the video amplifier 20. The reactance tube circuit is conventional in its provision of a multi-grid vacuum tube 22, conventionally connected with its anode-to-cathode circuit shunting the video amplifier output and a phase-splitting network 23, 24 to whose junction the control grid electrode 25 of tube 22, as well as the output terminal of rectifier 18, are connected.

As is well known, a reactance tube circuit is characterized by the fact that its output reactance, as measured between the anode and cathode of its tube, varies in response to changes in unidirectional control potential applied to the control grid electrode of the tube. In the present case this reactance control potential is derived from the output of rectifier 18 with the result that the reactance shunting the video amplifier output is directly controlled by the amplitude of the color synchronizing bursts. It is then a simple matter, well within the province of those skilled in the art, to select the components of the reactance tube circuit so that increases in rectifier output potential, denoting excessive color burst amplitude, will change the reactance so as to decrease the high frequency response of video amplifier 20, while decreases in rectifier output potential, which denote insufficient color burst amplitude, are made to change the reactance so as to increase the high frequency response of the video amplifier.

As a result, changes in the high frequency response of the signal path preceding the intermediate frequency amplifier 10 which are different from corresponding changes in its low frequency response and which are, therefore, not entirely eliminated by the low frequency responsive gain control exerted by rectifier 19 on the I.-F. amplifier, will be sensed by rectifier 19, which will control the reactance of circuit 21 so as to modify the high frequency response of video amplifier 20 to compensate for such variations.

Of course, changing of the output reactance of video amplifier 20 will have some residual effect on its low-frequency response, as well, but this will be so slight compared to its effect on the high frequency response as to be negligible, under most practical conditions.

It will be understood that the two embodiments hereinbefore described in detail do not exhaust the scope of my inventive concept. On the contrary, modifications thereof will readily occur to those skilled in the art. Accordingly I desire my invention to be limited only by the scope of the appended claims.

I claim:

1. In combination, a source of first and second signals in two different frequency bands and of third and fourth signals respectively at predetermined frequencies within said bands, said first and second signals being subject to intelligence representative variations in their relative amplitudes and also to fortuitous variations in their relative amplitudes, and said third and fourth signals being subject to substantially the same fortuitous variations in their relative amplitudes as said first and second signals but substantially free from other variations in relative amplitudes; a first variable gain signal transfer device supplied with and adapted to transfer said signals; means for deriving from the output of said first variable gain signal transfer device fifth, sixth, seventh and eighth signals, respectively proportional in amplitude to said first, second, third and fourth signals in the output of said first device, said fifth and sixth signals occuping two different frequency bands and said seventh and eighth signals being respectively at predetermined frequencies within said last-named bands; means supplied with the output of said deriving means and responsive thereto to produce a signal representative solely of the amplitude of said seventh signal; means for supplying said produced signal to said first signal transfer device to control the gain of said device for signals in the frequency bands of both said first and second signals; a second variable gain signal transfer device connected to the output of said deriving means and adapted to transfer signals in the frequency bands of said fifth and sixth signals; means supplied with the output of said deriving means and responsive thereto to produce a signal representative solely of the amplitude of said eighth signal; and means for supplying said last-named produced signal to said second signal transfer device to control the gain of said device only for signals in the frequency band of said sixth signal.

2. The combination of claim 1 further characterized in that said third and fourth signals and also said seventh and eighth signals have amplitudes which exceed a predetermined amplitude level, and in that each of said means supplied with the output of said deriving means and responsive thereto to produce signals respectively representative of the amplitudes of said seventh and eighth signals is responsive only to signals supplied thereto having amplitudes which exceed said predetermined level.

3. The combination of claim 1 further characterized in that each of said means responsive to the output of said deriving means to produce signals respectively representative of the amplitudes of said seventh and eighth signals includes means for selecting from the output of said deriving means only signals having amplitudes which exceed said predetermined amplitude level.

4. The combination of claim 1 further characterized in that said means for supplying said produced signal to said first signal transfer device to control the gain of said device is operative to control said gain equally for signals in the frequency bands of said first and second signals, and also characterized in that said means for controlling the gain of said second device is operative to control the gain of said device differently for signals in the frequency bands of said sixth signal than for signals in the frequency band of said fifth signal.

5. In combination, a source of first and second signals in two different frequency bands and of third and fourth signals respectively at predetermined frequencies within said bands, said first and second signals being subject to intelligence representative variations in their relative amplitudes and also to fortuitous variations in their relative amplitudes, and said third and fourth signals being subject to substantially the same fortuitous variations in their relative amplitudes as said first and second signals but substantially free from other variations in relative amplitudes; a first variable gain signal transfer device supplied with and adapted to transfer said signals; means for deriving from the output of said first variable gain signal transfer device fifth, sixth, seventh and eighth signals, respectively proportional in amplitude to said first, second, third and fourth signals in the output of said first device, said fifth and sixth signals occupying two different frequency bands and said seventh and eighth signals being respectively at predetermined frequencies within said last-named bands; means supplied with the output of said deriving means and responsive thereto to produce a signal representative solely of the amplitude of said seventh signal; means for supplying said produced signal to said first signal transfer device to control the gain of said device for signals in the frequency bands of both said first and second signals; a signal transducer connected to said deriving means and adapted to transfer signals in said frequency bands of both said fifth and sixth signals, said transducer having a variable frequency response; means supplied with the output of said deriving means and responsive thereto to produce a signal representative solely of the amplitude of said eighth signal; and means for supplying said last-named produced signal to said second signal transfer device to control the frequency response of said device only for signals in the frequency band of said sixth signal.

6. In a color television system a color television receiver adapted to reproduce images in color in response to composite image signals having a given spectrum and having a plurality of components including a color subcarrier component whose amplitude is fixed during predetermined intervals and during other intervals is a function of color saturation of a plurality of color aspects, and a periodically recurrent synchronizing component depicting television picture scanning synchronizing information, said receiver comprising in combination: a signal amplifier for said composite signal; frequency discriminatory means connected with said amplifier for controlling the gain of said amplifier at said subcarrier component frequency to the relative exclusion of other composite signal frequencies; means connected with said amplifier for developing a control signal in accordance with the amplitude of said subcarrier component during said predetermined intervals; and means connected with said frequency discriminatory means and said last-named means for controlling the gain of said amplifier at said subcarrier frequency in accordance with said control signal.

7. In a color television receiving system of a type designated to receive a composite color television signal which includes a deflection synchronizing component and a color subcarrier component, the relative phase of said subcarrier component depicting multicolor hue information and the relative amplitude of said subcarrier component depicting multicolor saturation information, said synchronizing component and said subcarrier component being at substantially opposite extremities of the frequency band occupied by said composite television signal, an automatic frequency response control circuit which acts to maintain a predetermined balance in amplitude between said synchronizing component and said subcarrier component, comprising in combination: amplifier means for communicating electrical signal variations representing said entire composite color television signal; means coupled with said amplifier means and responsive to a control signal for altering the effective frequency response of said amplifier means in a range of signal variations corresponding to that range of frequencies in which said subcarrier and its sideband components are represented, said control being substantially independent of other frequencies representing the remainder of said composite signal; means connected with said amplifier means responsive to signal frequencies corresponding to said subcarrier for generating a control voltage; means coupling said control voltage to said frequency response altering means to thereby regulate the amplitude of those signals delivered by said amplifier means which correspond to said subcarrier and associated sidebands; and an automatic gain control circuit coupled with said amplifier means and responsive to said synchronizing component for regulating the overall gain of said amplifier means for all signals passed thereby as a function of the amplitude of said composite signal synchronizing component.

8. An automatic frequency response control for a color television receiving system, said system being adapted to receive a composite color television signal embracing a relatively wide band of frequencies and including a line scansion synchronizing component, a recurrent blanking component, a color subcarrier component whose phase and amplitude are modulated to respectively depict the hue and saturation of all colors represented by said signal, a color synchronizing component occurring during the intervals of said blanking component, said burst component comprising a discrete number of cycles of a signal corresponding in frequency to the frequency of said color subcarrier and having a fixed amplitude, said scansion synchronizing component falling within said signal band at a substantially different frequency range than said burst and subcarrier components, said automatic frequency response control comprising: amplifier means of sufficient bandwidth to communicate electrical signal variations representing said entire composite color television signal; means coupled with said amplifier means and responsive to a first control signal for altering the effective gain of said amplifier means on a frequency selective basis in a region corresponding to substantially only that range of frequencies in which said subcarrier and attending phase and amplitude modulation products are represented; means connected with said amplifier means responsive to signal variations representing said color synchronizing burst component for developing a first control signal; means coupling said last-named means to said gain altering means for regulating the amplitude of signals delivered by said amplifier corresponding to said subcarrier and associated modulation products as a function of said first control signal; means coupled with said amplifier means and responsive to a second control signal for altering the effective gain of said amplifier means on a substantially non-frequency selective basis so as to control the effective gain of said amplifier for substantially all signal variations depicting the entire television signal; means coupled with said amplifier for developing a second control signal as a function of the amplitude of signal variations representing said line synchronizing component; and means coupling said last-named means with said non-frequency selective gain controlling means for applying said second control signal thereto.

9. An automatic frequency response control for a superheterodyne color television receiving system, said receiving system including an intermediate frequency amplifier system and a video frequency amplifier system, said receiving system further being adapted to receive a composite color television signal embracing a relatively wide band of frequencies and including a line scansion synchronizing component, a periodically recurring line blanking component, a color subcarrier component whose phase and amplitude are modulated to respectively depict the hue and saturation of all colors represented by said signal, a color synchronizing burst component occurring during the intervals of said blanking component, said burst component comprising a discrete number of cycles of a signal corresponding in frequency to the frequency of said color subcarrier component and having a fixed amplitude, said scansion synchronizing component falling within said signal band at a substantially different frequency range than said burst component, said automatic frequency response control comprising: means included in said intermediate frequency amplifier system for rendering the band-pass thereof sufficient to pass all signal variations representing the entire composite television signal; automatic gain control means coupled with said intermediate frequency amplifier system for varying the overall gain thereof as a function of the amplitude of signal representing said line synchronizing component; detector means coupling said intermediate frequency amplifier in driving relation to said video frequency amplifier system; means coupled with said video frequency amplifier system responsive to the amplitude of the color synchronizing burst to develop a control voltage; and means applying said developed control voltage to said video frequency amplifier system for controlling the gain thereof as to signal variations representing said subcarrier and associated phase and amplitude modulation products.

10. A color television receiver adapted to produce a color image in response to a composite signal comprising a chrominance component occupying a certain frequency band and a luminance component including frequecies outside said band, said chrominance component and said luminance component being subject to undesired relative variations in amplitude prior to their utilization to produce said image, said chrominance component comprising a subcarrier whose phase and amplitude during certain intervals are representative of hue and saturation of the colors in the image, and whose amplitude during other intervals does not vary appreciably as a function of color saturation but is subject to variations similar to any which occur during the first-mentioned intervals, said receiver comprising means for developing a control signal in accordance with the amplitude of said subcarrier during said other intervals, and means responsive to said control signal for varying the relative amplitudes of said chrominance and luminance components so as to compensate for any undesired relative variations in amplitude of said components that may have occurred.

11. A color television receiver adapted to produce a color image in response to a composite signal comprising a chrominance component occupying a certain frequency band and a luminance component including frequencies outside said band, said chrominance component and said luminance component being subject to undesired relative variations in amplitude prior to their utilization to produce said image, said chrominance component comprising a subcarrier whose phase and amplitude during certain intervals are representative of hue and saturation of the colors in the image, and whose amplitude during other intervals does not vary appreciably as a function of color saturation but is subject to variations similar to any which occur during the first-mentioned intervals, said receiver comprising means for developing a control signal in accordance with the amplitude of said subcarrier during said other intervals, signal transfer means for said components, said signal transfer means including a variable gain amplifier, and means for applying said control signal to said amplifier to vary the relative amplitudes of said chrominance and luminance components so as to compensate for any undesired relative variations in amplitude of said components that may have occurred.

12. A color television receiver according to claim 11, wherein said signal transfer means comprises a single channel, and the gain of said amplifier is varied for only one of said components to effect the relative amplitude variation.

13. A color television receiver adapted to produce a color image in response to a composite signal comprising a chrominance component occupying a certain frequency band and a luminance component including frequences outside said band, said chrominance component and said luminance component being subject to undesired relative variations in amplitude prior to their utilization to produce said image, said composite signal including a deflection synchronizing component recurring at a frequency outside said band, said chrominance component comprising a subcarrier whose phase and amplitude during certain intervals are representative of hue and saturation of the colors in the image, and whose amplitude during other intervals does not vary appreciably as a function of color saturation but is subject to variations similar to any which occur during the first-mentioned intervals, said receiver comprising means for developing a control signal which is a function of relative variation in amplitude of said subcarrier during said other intervals and said deflection synchronizing component, signal transfer means for said chrominance and luminance components, said signal transfer means including a variable gain amplifier, and means for applying said control signal to said amplifier to vary the relative amplitudes of said chrominance and luminance components so as to compensate for any undesired relative variations of the latter components that may have occurred.

14. A color television receiver adapted to produce a color image in response to a composite signal comprising a chrominance component occupying a certain frequency band and a luminance component including frequencies outside said band, said chrominance component and said luminance component being subject to undesired relative variations in amplitude prior to their utilization to produce said image, said composite signal including line-scanning intervals and blanking intervals, said chrominance component comprising a subcarrier which is present during said line-scanning intervals and during portions of said blanking intervals, and whose phase and amplitude during said line-scanning intervals are representative of hue and saturation of the colors in the image, and whose amplitude during said blanking intervals does not vary appreciably as a function of color saturation but is subject to variations similar to any which occur during the line-scanning intervals, said receiver comprising means for developing a control signal in accordance with the amplitude of said subcarrier during said blanking intervals, signal transfer means for said components, said signal transfer means including a variable gain amplifier, and means for applying said control signal to said amplifier to vary the relative amplitudes of said chrominance and luminance components so as to compensate for any undesired relative variations in amplitude of said components that may have occurred.

15. A color television receiver adapted to produce a color image in response to a composite signal derived by demodulation of a transmitted modulated carrier, said composite signal comprising a luminance component and a chrominance component and occupying a predetermined band of frequencies, said chrominance component occupying a chrominance frequency band within the upper frequency portion of said predetermined band, said luminance component occupying a band of frequencies including an appreciable bandwidth below said chrominance frequency band, said chrominance component being subject to undesired variations in amplitude relative to the luminance component below said chrominance frequency band prior to the utilization of said components to produce said image, said composite signal including line-scanning intervals and blanking intervals, said chrominance component comprising a sub-carrier which is present during the line-scanning intervals and during portions of said blanking intervals, and whose phase and amplitude during said line-scanning intervals are representative of hue and saturation of the colors in the image, and whose amplitude during said blanking intervals does not vary appreciably as a function of color saturation but is subject to variations similar to any which occur during the line-scanning intervals, said receiver comprising means for amplifying and detecting the received signal to derive said composite signal, means for developing a control signal in accordance with the amplitude of said subcarrier during said blanking intervals, signal transfer means for said components, said signal transfer means including a variable gain amplifier, and means for applying said control signal to said amplifier to vary the relative amplitudes of said chrominance and luminance components so as to compensate for any undesired relative variations in amplitude of said components that may have occurred.

16. A color television receiver according to claim 15 for reception of a composite signal which further includes horizontal synchronizing pulses occurring during said blanking intervals, said receiver further comprising means for developing a control signal in accordance with the amplitude of said synchronizing pulses, and means for controlling the over-all gain of said receiver in accordance with the last-mentioned control signal prior to the detection of the received signal, so as to decrease the receiver gain as the signal amplitude increases and to increase the receiver gain as the signal amplitude decreases.

17. A color television receiver adapted to produce a color image in response to a composite signal comprising a chrominance component occupying a certain frequency band and a luminance component including frequencies outside said band, said chrominance component and said luminance component being subject to undesired relative variations in amplitude prior to their utilization to produce said image, said composite signal including line-scanning intervals, blanking intervals and horizontal synchronizing pulses occurring during the blanking intervals, said chrominance component comprising a subcarrier which is present during said line-scanning intervals and during portions of said blanking intervals, and whose phase and amplitude during said line-scanning intervals are representative of hue and saturation of the colors in the image, and whose amplitude during said blanking intervals does not vary appreciably as a function of color saturation but is subject to variations similar to any which occur during the line-scanning intervals, said receiver comprising means for developing a control signal which is a function of relative amplitude variations of said subcarrier during said blanking intervals and said horizontal synchronizing pulses, signal transfer means for said components, said signal transfer means including a variable gain amplifier, and means for applying said control signal to said amplifier to vary the relative amplitudes of said chrominance and luminance components so as to compensate for any undesired relative variations in amplitude of said components that may have occurred.

18. A color television receiver adapted to produce a color image in response to a composite signal comprising chrominance and color synchronizing components occupying a given frequency band and luminance and scanning synchronizing components including frequencies outside said band, said receiver comprising means for detecting relative variations in amplitude of the scanning synchronizing and color synchronizing components, which variations are indicative of corresponding relative variations in the luminance and chrominance components, and means controlled by said first means for varying the relative amplitudes of said luminance and chrominance components in inverse relation to the first mentioned relative variations.

19. A color television receiver adapted to produce a color image in response to a composite signal comprising chrominance and color synchronizing components occupying a given frequency band and luminance and scanning synchronizing components including frequencies outside said band, said receiver comprising first amplifier means for said composite signal, means for controlling the overall gain of said amplifier means in accordance with variations in the amplitude of said scanning synchronizing component, second amplifier means supplied with said luminance and chrominance components derived from the output of said first amplifier means, and means responsive to variations in the amplitude of said color synchronizing component derived from the output of said first amplifier means for controlling the gain of said second amplifier means for said chrominance component relative to the gain thereof for said luminance component.

20. In color television apparatus, a color-saturation control apparatus comprising: a circuit for supplying the luminance, chrominance, deflection-synchronizing, and color-synchronizing components of a color-television signal; a signal-translating network for translating said chrominance and said luminance components in which the relative amplification of said translated components can be varied; means responsive to said deflection-synchronizing and color-synchronizing components for developing a control signal representative of any deviation of the amplitudes of said synchronizing components from a predetermined ratio; and means for utilizing said control signal to modify the relative amplitudes of said luminance and chrominance components translated through said network, thereby to effect automatic color-saturation control.

21. In color-television apparatus, a color-saturation control apparatus comprising: a circuit for supplying the luminance, chrominance, deflection-synchronizing, and color-synchronizing components of a color-television signal in which the peak amplitudes of said synchronizing components desirably have a predetermined ratio; a signal-translating network for translating said chrominance and color-synchronizing components as one group and said luminance and deflection-synchronizing components as another group of signals in which the relative amplification of said groups of signals can be varied; means responsive to said deflection-synchronizing and color-synchronizing components for developing a control signal representative of any deviation of said peak amplitudes of said translated synchronizing components from said predetermined ratio; and means for utilizing said control signal to modify the relative amplitudes of said luminance and chrominance components translated through said network and the relative amplitudes of said deflection-synchronizing and color-synchronizing components to maintain said predetermined ratio, thereby to effect automatic color saturation control.

22. In a color-television receiver, a color-saturation control apparatus comprising: a circuit for supplying the luminance, chrominance, deflection-synchronizing, and color-synchronizing components of an NTSC color-television signal in which the peak amplitudes of said synchronizing components desirably have a predetermined ratio; a signal-translating network for translating said chrominance and color-synchronizing components as one group and said luminance and deflection-synchronizing components as another group of signals in which the relative amplification of said groups of signals can be varied; means responsive to said deflection-synchronizing and color-synchronizing components for developing a control signal representative of any deviation of said peak amplitudes from said predetermined ratio; and means for applying said control signal to said network to modify the relative amplitudes of said luminance and chrominance components translated therethrough, thereby to effect automatic color-saturation control.

23. In color television apparatus, a color-saturation control apparatus comprising: a circuit for supplying the luminance, chrominance, deflection-synchronizing, and color-synchronizing components of a color-television signal; a signal-translating network for translating said chrominance and said luminance components in which the relative amplification of said translated components can be varied; means responsive to said deflection-synchronizing and color-synchronizing components for developing a control signal indicative of comparative amplitudes of said synchronizing components; and means for utilizing said control signal to modify the relative amplitudes of said luminance and chrominance components translated through said network, thereby to effect automatic color-saturation control.

References Cited by the Examiner

UNITED STATES PATENTS 2,635,140 4/53 Dome ---------------- 178—5.2

DAVID G. REDINBAUGH, *Primary Examiner.*

STEPHEN W. CAPELLI, NEWTON N. LOVEWELL, *Examiners.*